US008869100B1

(12) United States Patent
Szpak et al.

(10) Patent No.: US 8,869,100 B1
(45) Date of Patent: *Oct. 21, 2014

(54) DATA OBJECTS FOR MODEL-BASED DESIGN

(75) Inventors: Peter Szpak, Newton, MA (US); Paul Jackson, Southborough, MA (US); Peter Mott, Worcester, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/963,362

(22) Filed: Dec. 8, 2010

Related U.S. Application Data

(63) Continuation of application No. 09/859,071, filed on May 15, 2001, now Pat. No. 7,853,922.

(51) Int. Cl.
*G06F 9/44* (2006.01)
*G06G 7/62* (2006.01)

(52) U.S. Cl.
USPC .............................. 717/105; 717/106; 703/13

(58) Field of Classification Search
None
See application file for complete search history.

(56) References Cited

U.S. PATENT DOCUMENTS

| 5,477,474 A | 12/1995 | Southgate et al. |
| 5,487,018 A | 1/1996 | Loos et al. |
| 5,680,619 A * | 10/1997 | Gudmundson et al. ........ 717/108 |
| 5,758,160 A | 5/1998 | McInerney et al. |
| 5,875,331 A | 2/1999 | Lindsey |
| 5,937,409 A * | 8/1999 | Wetherbee ........................... 1/1 |
| 5,991,536 A * | 11/1999 | Brodsky et al. ............... 717/104 |
| 6,061,721 A | 5/2000 | Ismael et al. |
| 6,230,160 B1 | 5/2001 | Chan et al. |
| 6,230,315 B1 | 5/2001 | Nicholas |
| 6,282,699 B1 * | 8/2001 | Zhang et al. .................. 717/109 |
| 6,289,395 B1 | 9/2001 | Apte et al. |
| 6,854,120 B1 | 2/2005 | Lo et al. |
| 2002/0069401 A1 * | 6/2002 | Wall et al. ..................... 717/109 |
| 2002/0174124 A1 * | 11/2002 | Haas et al. .................... 707/100 |

OTHER PUBLICATIONS

Marc E. Herniter, "Schematic capture with MicroSim Pspice", 1996, Prentice Hall, 2nd ed., p. 47-49, 230-237, 419 255-262 and 418-419.*
Craig, Donald C., "Extensible Hierarchical Object-Oriented Logic Simulation with an Adaptable Graphical User Interface," A thesis submitted to the School of Graduate Studies, Department of Computer Science, Memorial University of Newfoundland, 197 pages, (1996).
Gay, David M., "Symbolic-Algebraic Computations in a Modeling Language for Mathematical Programming," Lucent Technologies, Seminar: Symbolic-algebraic Methods and Verification Methods—Theory and Applications, 9 pages. (2000).

(Continued)

*Primary Examiner* — James D Rutten
(74) *Attorney, Agent, or Firm* — Harrity & Harrity, LLP

(57) ABSTRACT

A method of defining data objects for use with an executable block diagram modeling and code generation system including providing pre-defined data object classes, each of the pre-defined data classes having default attributes, extending the pre-defined data object classes with subclasses, each of the subclasses having user-defined attributes and generating data objects, which are instances of the pre-defined classes and the subclasses.

20 Claims, 2 Drawing Sheets

(56) References Cited

OTHER PUBLICATIONS

Gehani, Samir B., "A Java-based Framework for Explicitly Partitioning Applications into Distributable Units," Thesis submitted in partial satisfaction of the requirements for the degree of Master of Science in the Department of Computer Science of the University of San Francisco, pp. 1-54 (2000).
Gest, S.B., "Generating Event Adapters to Facilitate Connections Between Java Beans," IBM Technical Disclosure Bulletin, vol. 41(1):125-128 (1998).
Moore, John Henry, "Microsoft's New, Improved Proxy Server," Windows IT Pro, 4 pages. (1997).
Pohlheim, Hartmut, "GEATbx: Genetic and Evolutionary Algorithm Toolbox for use with MATLAB," retrieved online at: http://www.geatbx.com/docu/index.html, 3 pages, (1998).
Rath, Dipak et al., "A Novel Approach to the Design and Implementation of a Power Electronics Simulation Software Package," Proceedings of the Twenty-Ninth Southeastern Symposium on System Theory, pp. 473-476 (1997).
Tarjan, Robert, "Depth-first Search and Linear Graph Algorithms," SIAM J. Comput., vol. 1(2):146-160 (1972).
Tarjan, Robert, "Enumeration of the Elementary Circuits of a Directed Graph," Cornell University Technical Report TR 72-145, pp. 1-12 (1972).
Tiernan, James C., "An Efficient Search Algorithm to Find the Elementary Circuits of a Graph," Communications of the ACM, vol. 13(12):722-726 (1970).
Weinblatt, Herbert, "A New Search Algorithm for Finding the Simple Cycles of a Finite Directed Graph," Journal of the Association for Computing Machinery, vol. 19(1):43-56 (1972).

\* cited by examiner

DATA OBJECTS FOR MODEL-BASED DESIGN

RELATED APPLICATION

This application is a continuation of U.S. patent application Ser. No. 09/859,071, filed May 15, 2001, the entire contents of which is hereby incorporated by reference.

TECHNICAL FIELD

This invention relates to data objects for model-based design.

BACKGROUND

Object-oriented applications organize data and routines together into encapsulated units generally referred to as objects. Object-oriented applications lead to modular software systems that have increased flexibility and are easy to alter and maintain.

An object model is a formal description of an object-oriented application. Semantic elements of an object model describe object classes, attributes of object classes, relationships between object classes and inheritance between object classes. One example object-oriented application is block diagram modeling. Dynamic real-world systems such as electrical circuits, shock absorbers, braking systems, and many other electrical, mechanical and thermodynamic systems may be modeled, simulated and analyzed on a computer system using block diagram modeling. Block diagram modeling graphically depicts time-dependent mathematical relationships among a system's inputs, states and outputs, typically for display on a graphical user interface (GUI). Block diagram modeling may also be used to simulate the behavior of a system for a specified time span. Block diagram modeling can also be used to design the algorithms to control the real-world systems being modeled.

SUMMARY

In an aspect the invention features a method of defining data objects for use with an executable block diagram modeling and code generation system including providing pre-defined data object classes, each of the pre-defined data classes having default attributes, extending the pre-defined data object classes with subclasses, each of the subclasses having user-defined attributes and generating data objects, which are instances of the pre-defined classes and the subclasses.

One or more of the following features may also be included. The method may further include storing the data objects and the subclasses. The method may further include the generation of data objects by loading information from an external database through a data exchange interface. The method may further include generating executable code from the executable block diagram system, the executable code containing the attributes of the extended pre-defined data objects with subclasses. The executable code runs on a target processor. The method may further include generating executable code from the executable block diagram system, the executable code containing the attributes of the extended pre-defined data objects with subclasses and pre-defined data objects from the external database. The method of claim 6 wherein the executable code runs on a target processor. The method may further include generating a report containing the data object classes and subclasses used in the executable block diagram modeling system.

In another aspect the invention features a method of block diagram modeling including providing pre-defined data object classes, each of the pre-defined data classes having default attributes, extending the pre-defined data object classes with subclasses, each of the subclasses having user-defined attributes, generating instances of the data objects based on the pre-defined classes and the user-defined attributes, providing blocks representing functional entities that operate of the instances of data objects and generating output from the blocks.

One or more of the following features may also be included. The method may further include loading instances of pre-defined data objects from an external database through a data exchange interface. The method may further include generating code including the pre-defined object classes and extended pre-defined object classes with subclasses. Generating code includes the pre-defined object classes, extended pre-defined object classes with subclasses and the pre-defined data objects from the external database.

In another aspect the invention features a block diagram modeling method including simulating a system in a block modeling diagram system using instances of data objects, the data objects based on pre-defined data object classes having default attributes and subclasses having user-defined attributes.

One or more of the following features may also be included. The method may further include defining characteristics of an algorithm from the data objects. The method may further include documenting a form and functionality of the algorithm designed in the block diagram modeling system, including the information captured in the associated data objects. The data objects may be loaded from an external database through a data exchange interface. In another aspect the invention features an automatic code generation method including generating program code to represent an algorithm designed in a block diagram modeling system, including characteristics of the algorithm defined by the associated data objects.

One or more of the following features may also be included. The method may further include defining characteristics of the code generation method and the resulting generated code from the data objects. The method may further include compiling the generated program code for execution on a target processor. The method may further include combining the generated program code with externally generated and hand-written legacy program code.

Embodiments of the invention may have one or more of the following advantages.

A data object enables a user to fully define the information related to the data to be used with a model-based design environment as part of the data itself, as opposed to having to enter this information into the model in some other manner. The data object is used to define parameter, signal and state information for use in block diagram modeling.

Data objects may be built upon an object-oriented framework giving user the ability to subclass the built-in object classes and thus extend the list of attributes associated with a given parameter, signal or state in a model.

The extensibility of the data objects enable users to generate data object classes that mimic the structure of their own databases, which facilitates a seamless transfer of information both to and from the model-based design in environment.

Information stored as part of data is available throughout the design process, enabling users to have a single data definition with all of the information required to fully define their algorithm. This reduces the redundancy, inconsistency and errors associated with having multiple sources or copies of data. The ability to embed references (e.g., pointers/dynamic links) within data objects makes it possible for objects to share common pieces of information, which further reduces redundancy and inconsistency.

Data objects lends itself to the development of secondary tools to further simplify the task of defining, viewing and modifying data associated with a model.

Data objects provide a means for generating code based on information contained within the data object itself.

The block diagram model and generated code inherit attributes from the data associated with the model rather than this information being specified directly in the model itself.

All information specified in the data object is available throughout the model-based design environment and is propagated to all stages of the process. This includes user-extended attributes that are not directly recognized or used by the model-based design tools.

The user has complete control over the structure and attributes associated with data objects through subclassing available through a object-oriented library framework.

Other features and advantages of the invention will become apparent from the following description, including the claims and drawings.

DESCRIPTION OF DRAWINGS

Like reference symbols in the various drawings indicate like elements.

DETAILED DESCRIPTION

Figure 1:
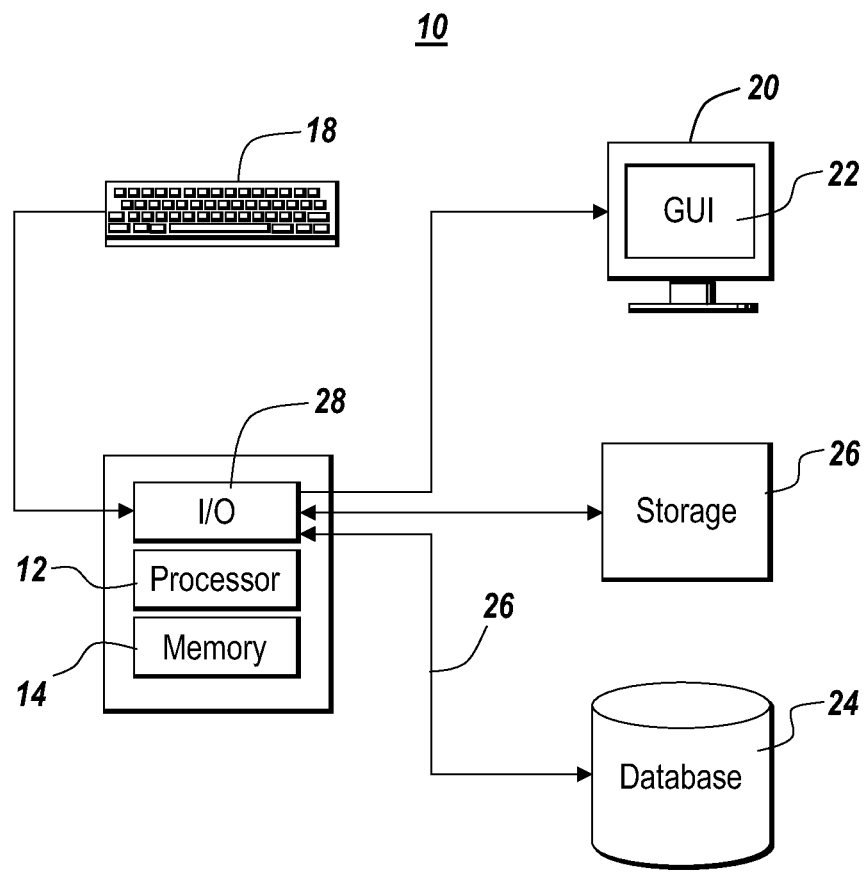
FIG. 1 is a block diagram of an exemplary computer system.

To better understand the invention it is helpful to clarify the general meanings of terms used in connection with object-oriented systems.

An "object class" is a set of data (attributes) and functional capabilities (routines) encapsulated into a single logical entity.

An "object instance" is an embodiment (instantiation) of an object class. Instances are differentiated from one another by their attribute values, but not their routines (capabilities). The term "object" is often used by itself to refer loosely to either an object class or an object instance, the difference being understood in context.

An "object-oriented application" is an operational computer program which when employed on an appropriate computer system uses a set of object instances that work in cooperation to perform useful work.

An "object model" is a set of object classes that together form a blueprint for building an object-oriented application. Each object class of an object model can have attributes, inheritances, and relationships. Object models may be in the form of "logical models" generated by particular modeling tools and employing particular modeling languages, or "unified models" generated by a repository adaptor tool (or the like) and employing a unified modeling language, such as Unified Modeling Language (UML).

A "relationship" defines a link between two object classes.

"Attributes" are data elements of object classes that are expressed through particular values in object instances.

An "object ID" is used to uniquely identify each object instance. The object ID can be generated in one of two ways.

It can be generated by the application, which can automatically assign a unique object id for each new object instance. Alternatively, it can comprise a set of attributes that are guaranteed in the object model to always form a unique set of values for an instance. In this case, the create routine will require a unique set of attributes in order to create a new object instance.

A "routine" is a functional capability associated with an object class.

"Inheritance" represents a specialization of an object UI class in which the specialized class shares all of the attributes and routines of parent classes. Inheritance can extend across many object class "generations."

Inheritance can be "vertical" (concrete) or "horizontal" (abstract) according to how the information corresponding to inherited attributes is stored in the database. In the case of vertical inheritance between two object classes in an object model, the database contains data associated with each object class. In the case of horizontal inheritance between two object classes in the object model, the database does not contain data associated with each object class. Horizontal and vertical inheritance can be mixed within the same object model.

The attributes, inheritances, and relationships of all the object classes of an object model are called the "semantics" or "semantic elements" of the object model. An object model contains certain information associated with its semantics. For each attribute, the object model contains information as to whether that attribute is to be associated with the object ID for the class. For each inheritance, the object model contains information as to whether the inheritance is vertical or horizontal (concrete or abstract.

Example object-oriented languages are C++ and JAVA®.

Referring now to FIG. 1, an exemplary computer system 10 includes a processor 12 coupled to a memory 14, a plurality of storage devices 16, and a user interface 18, 20, such as a keyboard 18 and screen 20 on which a graphical user interface (GUI) 22 is implemented. The processor 12 is also coupled to hardware associated with the at least one database 24. The database 24 may include a further storage device, such as a hard drive or a non-volatile memory; structured data; and a database management system (DBMS). In some examples, the database 24 may have its own associated hardware, including a database processor (not shown) distinct from the above-mentioned processor 12. In other examples the database 24 is a software entity that modifies and is executed by the processor 12, in which case a network 26 may not be present.

Also shown is an input/output section 28 coupled to the processor 12 providing input/output functions and interfacing between the user interface 18, 20, the plurality of storage devices 16, the network 26, and the database 24.

Figure 2:
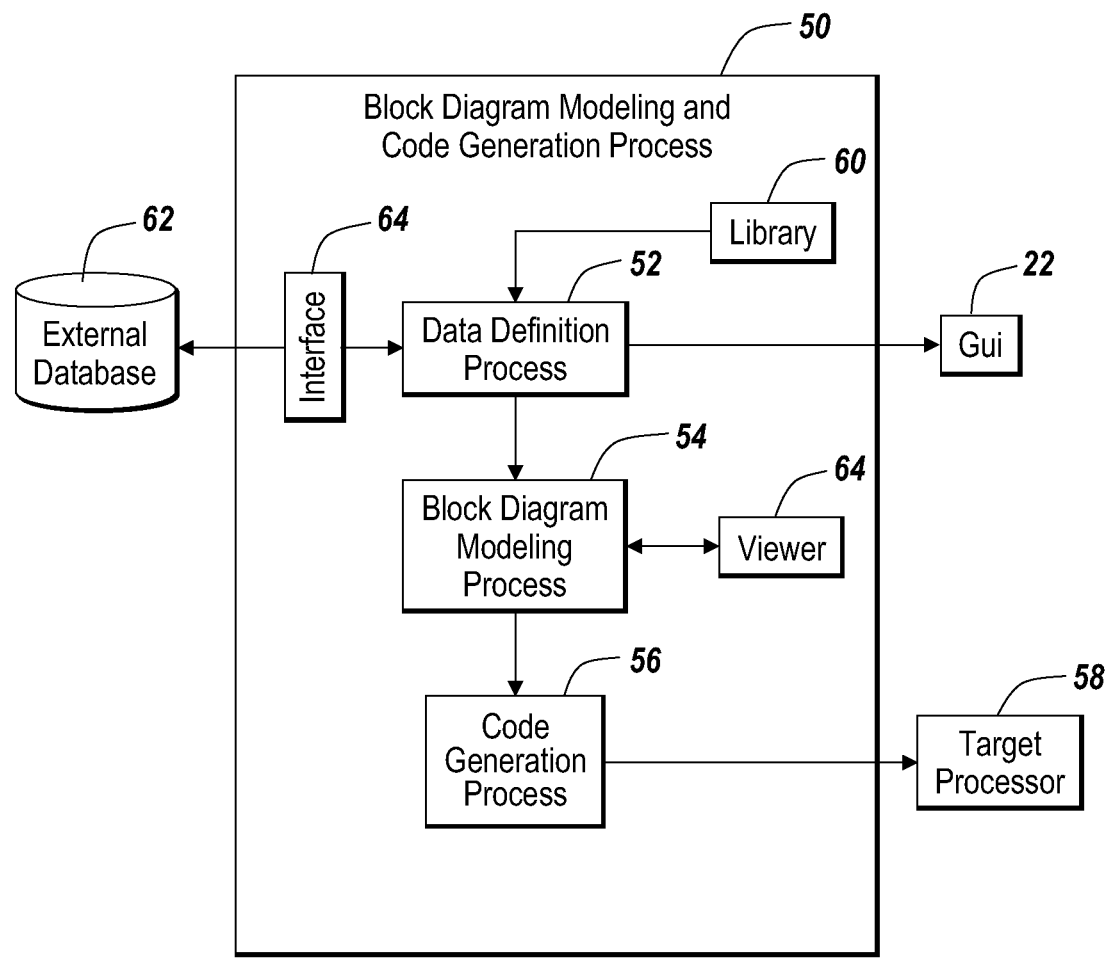
FIG. 2 is a diagram of a block diagram modeling code generation process.

Referring to FIG. 2, a block diagram modeling and code generation process 50 includes a data definition process 52, a block diagram modeling process 54 and a code generation process 56. The data definition process 52 provides a user using the user interface 18, 20 with the capability of defining data (e.g., parameters and signals) that will be used by the block diagram modeling process 54 and the code generation process 56.

The block diagram modeling process 54 graphically depicts time-dependent mathematical relationships among a system's inputs, states and outputs, typically for display on the graphical user interface (GUI) 22. The block diagram modeling process 54 may also be used to simulate the behavior of a system for a specified time span. Further, the block diagram modeling and process 54 can also be used to design the algorithms to control the real-world systems being modeled using the code generation process 56. Specifically, the code generation process 56 writes executable programs in a software language such as C that can execute on a desired target processor 58. An example code generation process 56 is Real Time Workshop® developed by MathWorks and incorporated by reference herein.

As mentioned above, the data definition process 52 provides the user with a GUI 22. The GUI 22 enables the user to fully define data objects with information related to the data to be used by the block diagram modeling process 54 and the code generation process 56. The data objects are used to define parameter, signal and state information. The data objects are built on an object-oriented framework library 60, such as the Unified Data Dictionary (UDD) developed by MathWorks as part of its MATLAB® product, incorporated by reference herein. Data objects represent not only values to be used by the block diagram modeling process 54, but also attributes (e.g., values, storage classes, data types) independent of the block diagram modeling process 54. The object-oriented framework library 60 provides an initial schema. Certain attributes are part of built-in data object classes and are contained in the object-oriented framework library 60. Tools contained in the block diagram recognize these built-in attributes modeling process 54 and can affect both the algorithm being designed and the interpretation of associated data. For example, a parameter object's "value" attribute is used to parameterize a model. The "storage class" attribute is used to define how parameters, signals and states are to be treated during simulation in the block diagram modeling process 54 and during code generation in the code generation process 56. For example, Simulink®, designed by MathWorks and incorporated by reference herein, identifies parameter, signal and state objects by using the same resolution mechanism used for other MATLAB® variables.

In the data definition process 52, the user specifies data attributes for associated data objects that are used in the block modeling process 54 and the code generation process 56. These attributes may be default attributes found in the library 60 and/or user-defined, i.e., customized attributes, specified by the user and application-specific. A set of default data attributes is contained in the parameter signal library 60. The user may generate subclasses of the default data attributes for parameters and signal object classes to represent data attributes resident in an external database 62. The data definition process 52 imports information contained in the user's external database 62 after the user specifies a custom datum, which becomes associated with the data object for use in the block diagram modeling process 54 and the code generation process 56. The data definition process uses one of a plurality of standard interfaces 64 to incorporate the attributes found in the external database 62 with the user specified parameter. Example interfaces are the Oracle® database interface and DBII database interface and correspond to data exchange files published by the external database system providers. Such interfaces to the external data and their corresponding attributes take advantage of the inheritance capability and class structure used in the data definition process 52.

The data objects may be represented in memory 12 in any one of a plurality of software data structures, such as a C language STRUC, i.e., structure, or a JAVA Class, for example.

Both default attributes and user specified attributes obtained from the external database 62 are contained in the data object.

Thus, all the information specified by the user in the data object is made available and propagated to the block diagram modeling process 54. This includes user-extended attributes that are not resident in the library 60. Using the data objects specified by the data definition process 52, the block diagram modeling process 54 graphically depicts time-dependent mathematical relationships among a system's inputs, states and outputs, typically for display on the graphical user interface (GUI) 22. Each of the data object's attributes may be viewed by the user on a parameter and signal viewer 64. Both default and user-specified attributes for the data object are displayed on the GUI 22 since the data object and its associated attributes are stored in a single data structure when defined in the data definition process 52.

The fact that all information is stored as part of the data and is available throughout the block diagram modeling process 54 enables the user to have a single data definition with all of the information to fully define the code generated by the code generation process 56.

The block diagram modeling process 54 feeds its modeling information to the code generation process 56 for generation of code for the target process 58. Generated code is based on the information contained within the data object (s). More specifically, built-in attributes from the library 60 are made available during code generation. In addition, all data attributes added/specified by the user in the data definition process 52 are made available. These attributes, both default and custom, are accessed by the code generation process 56 and used to perform specialized customizations and optimizations of code generation for eventual execution of the code on the target processor 58.

Process 50 is not limited to use with the hardware/software configuration of FIG. 1; it may find applicability in any computing or processing environment. Process 50 may be implemented in hardware (e.g., an ASIC {Application-Specific Integrated Circuit} and/or an FPGA {Field Programmable Gate Array}), software, or a combination of hardware and software.

Processes 50 may be implemented using one or more computer programs executing on programmable computers that each includes a processor, a storage medium readable by the processor (including volatile and non-volatile memory and/or storage elements), at least one input device, and one or more output devices.

Each such program may be implemented in a high level procedural or object-oriented programming language to communicate with a computer system. Also, the programs can be implemented in assembly or machine language. The language may be a compiled or an interpreted language.

Each computer program may be stored on a storage medium or device (e.g., CD-ROM, hard disk, or magnetic diskette) that is readable by a general or special purpose programmable computer for configuring and operating the computer when the storage medium or device is read by the computer to perform process 50.

Process 50 may also be implemented as a computer-readable storage medium, configured with a computer program, where, upon execution, instructions in the computer program cause the computer to operate in accordance with process 50.

Further aspects, features and advantages will become apparent from the following.

What is claimed is:

1. A non-transitory computer-readable medium storing one or more computer executable instructions, the instructions comprising:
   one or more instructions that, when executed by a processor, cause the processor to:
   access a model,
      the model including a parameter or a signal,
         the parameter or the signal operating on data, the data being stored in an external data source that is independent of the model;
   generate a data object, at least in part, by loading information from the external data source,
      the data object:
         comprising a custom attribute for use in affecting a behavior of an operation performed by the model with respect to the data,
      the custom attribute having an assigned value;
         propagate the custom attribute to the model to define an aspect of the parameter or an aspect of the signal; and
         perform the operation by operating on the data object using a block in the model, the operating:
            affecting an interpretation of the data operated on by the model, and
            being based on the assigned value for the custom attribute of the parameter or the signal.

2. The non-transitory computer-readable medium of claim 1, where the affecting the behavior includes at least one of:
   determining, the behavior of the operation,
   controlling, the behavior of the operation,
   configuring, or the behavior of the operation, or
   manipulating the behavior of the operation.

3. The non-transitory computer-readable medium of claim 1, where the operation includes at least one of:
   graphically depicting the model,
   generating code for the model, or
   simulating the model.

4. The non-transitory computer-readable medium of claim 1, where the operation includes:
   generating code for the model, and
   where the value of the custom attribute affects a representation of the data in the generated code.

5. The non-transitory computer-readable medium of claim 1, where the operation includes:
   combining code generated for the model with externally generated legacy code.

6. The non-transitory computer-readable medium of claim 1, wherein:
   where the operation includes generating code for the model, and
   where the value of the custom attribute defines at least one of:
      a customization of the code generated for the model, or
      an optimization of the code generated for the model.

7. The non-transitory computer-readable medium of claim 1, where the value of the custom attribute is contained in the data object.

8. The non-transitory computer-readable medium of claim 7, where a definition of the custom attribute is specified by a user.

9. A method comprising:
   accessing a model,
      the accessing being performed by a computing device, and
      the model including a parameter or signal,
         the parameter or signal operates on data,
            the data being stored in an external data source that is independent of the model;
   generating a data object, at least in part, by loading information from the external data source,
      the generating being performed by the computing device, and
      the data object comprising a custom attribute for use in affecting a behavior of a process stage in the model with respect to the data,
      the custom attribute having an assigned value;
   propagating the assigned value of the custom attribute to the model at the process stage to define an aspect of the parameter or an aspect of the signal,
      the propogating being performed by the computing device; and
   processing the model at the process stage based on the assigned value of the custom attribute,
      the processing being performed by the computing device, and
      the processing comprising:
         operating on the data object using a block in the model, the operating:
            affecting an interpretation of the data operated on by the model, and
            being based on the assigned value for the custom attribute of the parameter or the signal.

10. The method of claim 9, where the data object is associated with an identifier, and
   where the value of the custom attribute is accessible to the model using the identifier.

11. The method of claim 9, where the process stage includes generating code for the model, and
   where the value of the custom attribute defines a representation of the data in the code generated for the model.

12. The method of claim 9, where the process stage includes generating code for the model, and
   where the value of the custom attribute defines an optimization of code generated for the model.

13. The method of claim 9, where an an object class, associated with the data object, is based on a schema, provided by an object-oriented framework, that defines the custom attribute.

14. A device comprising:
   one or more processors to:
      access a model,
         the model including a parameter or signal,
            the parameter or signal being associated with data,
               the data being stored in an external data source that is independent of the model;
      generate a data object,
         when generating the data object, the one or more processors being to:
            load information from the external data source, and
            the data object including a custom attribute for use in affecting a behavior of an operation performed by the model with respect to the data,
            the custom attribute having an assigned value;
      propagate the custom attribute to the model to define an aspect of the parameter or an aspect of the signal; and
      perform the operation by operating on the data object using a block in the model,
         the operating affecting an interpretation of the data operated on by the model and being based on the assigned value for the custom attribute of the parameter or the signal.

15. The device of claim 14, where the affecting the behavior includes at least one of:
   determining the behavior of the operation,
   controlling the behavior of the operation,
   configuring the behavior of the operation, or
   manipulating the behavior of the operation.

16. The device of claim 14, where the operation includes at least one of:
   graphically depicting the model,
   generating code for the model, or
   executing the model.

17. The device of claim 14, where the operation includes: generating code for the model,
   where the value of the custom attribute affects a representation of the data in the generated code.

18. The device of claim 14, where the operation includes: combining code generated for the model with externally generated legacy code.

19. The device of claim 14, where the operation includes generating code for the model, and
   where the value of the custom attribute defines at least one of:
      a customization of the code generated for the model, or
      an optimization of the code generated for the model.

20. The device of claim 14, where the value of the custom attribute is contained in the data object.

* * * * *

UNITED STATES PATENT AND TRADEMARK OFFICE
CERTIFICATE OF CORRECTION

PATENT NO. : 8,869,100 B1  
APPLICATION NO. : 12/963362  
DATED : October 21, 2014  
INVENTOR(S) : Peter Szpak et al.

Page 1 of 1

It is certified that error appears in the above-identified patent and that said Letters Patent is hereby corrected as shown below:

In the Claims

Please correct Claim 6 as follows:

Column 7, line 39, after -- 1, -- delete "wherein:".

Please correct Claim 13 as follows:

Column 8, line 30, after "where an" delete "an".

Signed and Sealed this
Twenty-eighth Day of July, 2015

Michelle K. Lee
*Director of the United States Patent and Trademark Office*